United States Patent [19]

Hamilton

[11] 4,361,944

[45] Dec. 7, 1982

[54] BARREL LOCK FERRULE EXTRACTOR

[76] Inventor: Earle B. Hamilton, P.O. Box 943, Buckingham, Pa. 18912

[21] Appl. No.: 270,384

[22] Filed: Jun. 4, 1981

[51] Int. Cl.[3] .............................................. B23P 19/04

[52] U.S. Cl. ........................................ 29/256; 29/258; 29/263; 411/433

[58] Field of Search ................. 29/256, 258, 260, 261, 29/262, 263, 265, 280, 282, 259; 411/432, 433, 434

[56] References Cited

U.S. PATENT DOCUMENTS

| | | | |
|---|---|---|---|
| 165,562 | 7/1875 | Gravelius | 29/260 |
| 1,717,822 | 6/1929 | Wentworth | 29/260 |
| 2,705,983 | 4/1955 | Guadagna | 411/432 |
| 4,235,004 | 11/1980 | Floyd | 29/256 |

FOREIGN PATENT DOCUMENTS

| | | | |
|---|---|---|---|
| 967424 | 6/1948 | France | 29/256 |

*Primary Examiner*—James L. Jones, Jr.
*Assistant Examiner*—A. R. Petrosky
*Attorney, Agent, or Firm*—Paul & Paul

[57] ABSTRACT

An extractor for the flanged tubular ferrule which surrounds the head of the barrel lock of a kilowatt-hour meter comprises an actuating screw and a two-piece clamp. The clamp has a threaded hole and two recesses of different diameters, the larger of which is adapted to fit around the flange of the ferrule and the smaller of which is adapted to fit around the body of the ferrule. To remove the ferrule, the two pieces of the clamp are fitted over the ferrule and then fastened together by bolts. Then the actuating screw is screwed into the clamp until the inner end of the screw abuts against the head of the barrel lock which is inside the tubular ferrule. Continued rotation of the actuating screw in a tightening direction causes the clamp to move outwardly on the threads of the screw and in so doing the captive ferrule is pulled out of the cover housing. Following removal of the ferrule, the barrel lock itself may be removed by a barrel lock extractor, preferably of the type described in my U.S. Pat. No. 4,060,884, granted Dec. 6, 1977.

3 Claims, 4 Drawing Figures

BARREL LOCK FERRULE EXTRACTOR

BACKGROUND OF THE INVENTION

Certain known types of locking rings of electric utility kilowatt-hour meters comprise split rings having radially outward extensions at the free ends. These free ends are clamped together with a tangential screw to lock the meter tightly down on the meter base. A known type of steel cover completely encloses and protects the locked ring and extensions. Such a kilowatt-hour meter is illustrated in FIG. 1 of the drawing. Aligned tangential apertures are provided in the outer ends of the ring-end extensions, in the partitions, and in the right side of the cover, for receiving a known form of hollow cylinder barrel lock having an annular head which extends laterally outward of the cover for a short distance and which locks the cover in place. The annular head of the barrel lock has a transverse diametral hole for insertion of a lead seal wire. The inner end of the barrel lock has a pair of opposed transverse ball detents which extend laterally outward beyond the inward partition and prevent withdrawal of the barrel lock. These detents are releaseable by means of a known form of cylindrical key which is inserted into the hollow end of the barrel lock and is operated by a cammed handle provided at the outer end. This key has a longitudinally split insert element of small diameter which is insertable in the hollow of the barrel lock and is adapted for spreading the outer ends of the insert element to release the ball-detent locking mechanism in the barrel lock.

Kilowatt-hour meters of electric utility power companies are frequently installed in exposed locations where they are subject to tampering. Attempts have been made, by vandals, to drill into the barrel lock central aperture. This action is usually not productive. It often leaves a broken drill in the barrel lock aperture which prevents the key from being used to remove the barrel lock. Also, due to exposure to weather and other conditions, the inner mechanism of the barrel lock, after long periods of time, sometimes becomes so corroded that the key is inoperative to release the ball detents, and the barrel lock then cannot be removed by means of the key.

A newer style of cover housing containing a tubular ferrule has recently become available. The purpose of this ferrule is to provide a means for using a flat plastic frangible seal instead of, or in addition to, the lead seal wire. However, the presence of this ferrule prevents use of a barrel-lock extractor of the type described in my U.S. Pat. No. 4,060,884. A separate extractor for the ferrule must be provided and used before the barrel-lock extractor can be used.

SUMMARY OF THE PRESENT INVENTION

The present invention concerns kilowatt-hour meters having a cover housing which contains a tubular ferrule which covers the head of the barrel lock, and the object of the invention is to provide an extractor capable of removing the ferrule so that a barrel lock extractor may be used to remove the damaged or frozen barrel lock.

A more particular object is to provide an extractor for the tubular ferrule in the cover housing of a barrel lock kilowatt-hour meter for bodily removing the ferrule by grasping the exposed flanged part of the ferrule and applying thereto sufficient longitudinal pulling force to compress the ferrule, or deform the inner annular lip of the ferrule, or to enlarge the hole in the cover housing in which it is captive, or to do both or all, to an extent necessary to remove the ferrule from the cover housing.

DETAILED DESCRIPTION OF THE PREFERRED EMBODIMENTS

Figure 1:
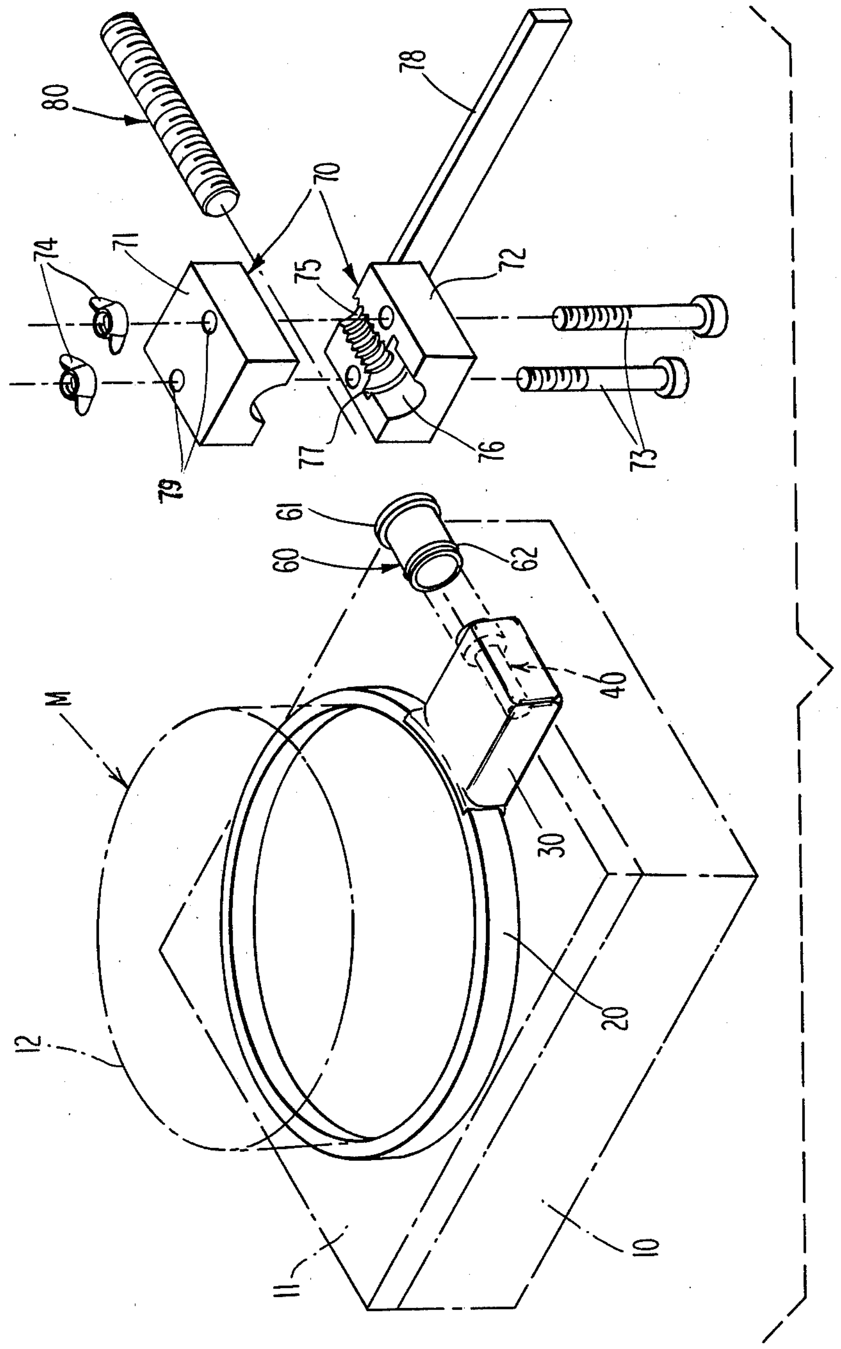
FIG. 1 is an exploded perspective view showing the ferrule extractor of the present invention.

FIG. 1 shows, in phantom, a kilowatt-hour meter M mounted on a rectangular metal terminal box 10 having a metal lid 11. Conventionally, the lid 11 is provided with a circular aperture whose edge is struck upwardly and then bent radially outwardly to provide a peripheral ledge and an annular external recess or crevice (not illustrated). The meter M has an outer rim (not illustrated) which rests on the peripheral ledge of the lid aperture. The meter has a cylindrical glass dome 12 provided with an external peripheral bead (not illustrated) which rests on the outer rim of the meter. The peripheral ledge of the lid 11, the rim of the meter M, and the external bead of the dome 12, have the same outer diameters and are arranged concentrically. To prevent removal of the meter, or tampering with the meter, it is known to use a split locking ring 20 of channel shaped cross section which, when spread at the split, is adapted to be placed over the meter and over the bead and rim so that the lower side of the channel is received in the annular crevice of the ledge of the lid 11 and the upper side of the channel engages over the bead of the dome, thereby to hold the meter M and the dome 12 tightly and securely to the lid 11.

Figure 2:
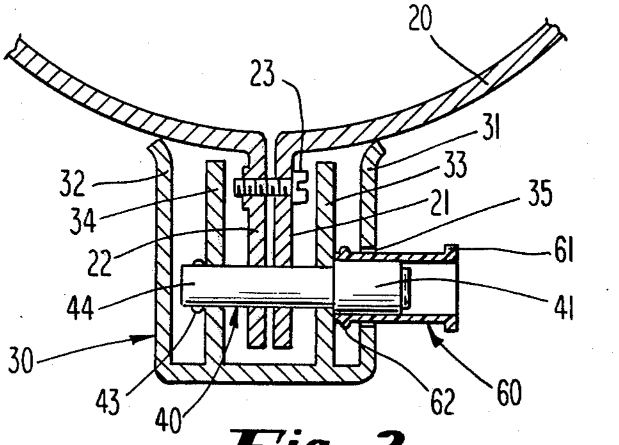
FIG. 2 is a view, in section, showing the barrel lock and the tubular ferrule which covers the head of the barrel lock.
Figure 3:
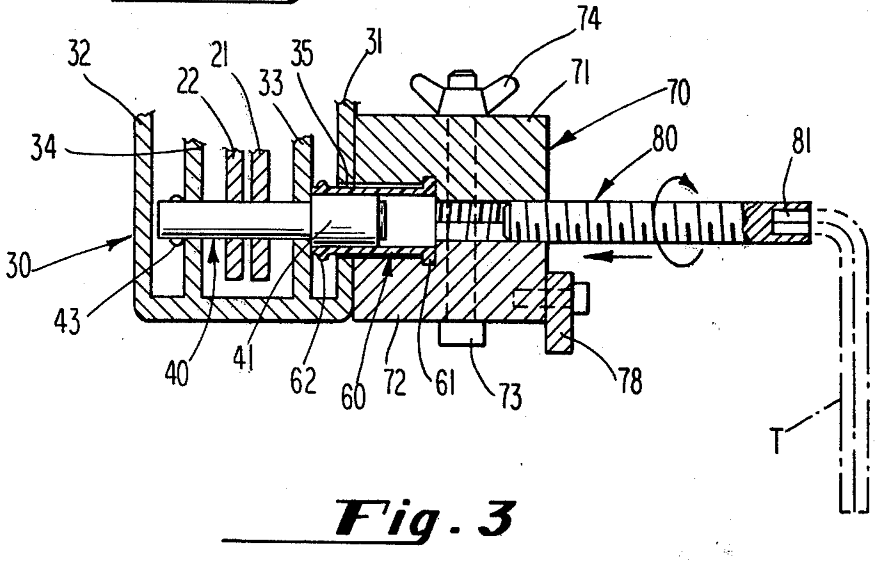
FIG. 3 is a view, in section, showing the components of the ferrule extractor in place and ready for the actuating screw to be rotated by the tool T shown in phantom.
Figure 4:
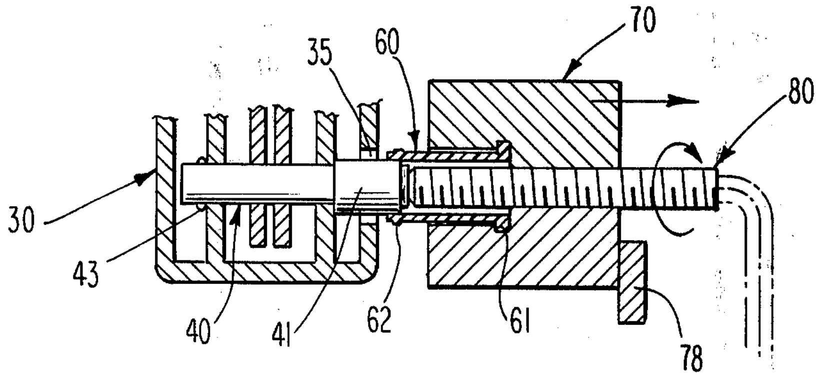
FIG. 4 is a view, in section, showing the ferrule extracted from the housing by the ferrule extractor.

As seen in FIGS. 2–4, the blocking ring 20 is split, and extending radially outwardly at the split are end extensions or flanges 21,22 which are clamped together by a screw 23. It will be seen that so long as the end extensions 21,22 are clamped together, the ring 20 cannot be removed. To prevent removal of clamp screw 23 and removal of locking ring 20, the flanges 21,22 and clamp screw 23 are covered by a steel cover housing 30 having an opening at its radially inward side for receiving the flanges 21,22. The inward open side of the cover housing abuts against the meter.

Extending inwardly from the front wall of the cover housing 30 are a pair of partitions 33,34, one on each side of flanges 21,22 of the locking ring 20. Aligned tangential holes are provided in the partitions 33,34, and in the flanges 21,22, for receiving the hollow barrel 44 of a hardened steel barrel lock 40. Barrel lock 40 has an enlarged annular head 41 which projects very slightly through a hole in the sidewall 31 of the cover housing 30. The inward end of the hollow barrel 44 of barrel lock 40 is provided with a pair of opposed ball detents 43 which retain the barrel lock in the position shown in FIGS. 2–4. The ball detents 43 are releasible by a cylindrical key (not shown) which is inserted into the hollow bore of the barrel lock 40 and is operated by a cammed handle at its outer end. The key has a longitudinally split insert element of small diameter which is insertible in the hollow bore of the barrel 44 and is adapted for spreading the outer ends of the insert element to release the ball detent locking mechanism. The barrel lock and key mechanism are shown in the art and are not part of the present invention.

The meter and its locking means are ordinarily exposed to the weather and it frequently happens that, after a period of time, the barrel lock 40, due to corrosion, becomes frozen in its locked position and extremely difficult to remove by means of the key which is ordinarily used for this purpose. Also, due to the fact that a very small portion of the enlarged head 41 of the barrel lock projects beyond the sidewall 31 of the cover 30, the length of such projection being of the order of 3/16 inch, and the material being hardened steel, it is virtually impossible to obtain a grasp on the head for extraction by means other than by use of the extractor described and claimed in my U.S. Pat. No. 4,060,884.

As shown and illustrated in U.S. Pat. No. 4,060,884, the head 41 of the barrel lock 40 has a hole 42 therethrough in a diametric dimension for receiving a lead seal wire. More recently, a tubular ferrule is placed over the barrel lock, the purpose of which is to provide a means for using a flat plastic frangible seal instead of or in addition to the lead seal wire just mentioned. However, the addition of this ferrule prevents the use of the barrel lock extractor of my U.S. Pat. No. 4,060,884. A separate extractor for the ferrule is needed before the barrel lock extractor of U.S. Pat. No. 4,060,884 can be applied and used.

As illustrated in FIG. 1, the tubular ferrule 60 has at its outer end an enlarged shoulder or flange 61, and has at its inward end on annular ring or rib 62. As shown in FIG. 2, when the ferrule 60 is in its normal position, flange 61, which is rectangular in cross section, is outside the cover housing 30. Rib 62, which is hemispherical in cross section, is inside the cover housing 30. And, since the annular rib 62 is larger in diameter than the hole 35 in the sidewall 31, the ferrule is captive in the cover housing.

The ferrule extractor provided by the present invention comprises a two piece clamp 70 consisting of an upper half 71 and a lower half 72. Each of the halves 71 and 72 is provided with a pair of vertical through holes 79 for receiving capscrews or bolts 73 on which wing nuts 74 are screwed and tightened to hold in abutting relation the upper and lower halves 71,72 of the clamp. Each of the clamp halves 71,72 is provided with a threaded portion 75 of semicircular cross-section, and with two recess portions 76 and 77, each semi-circular in cross-section with recess 77 being larger in diameter than recess 76. Thus, when the two clamp halves 71,72 are fastened together in abutting relation, the clamp 70 contains a threaded circular hole 75 at its outward portion, a circular recess 76 at its inward portion, and a recess 77 of larger diameter at the interface between recess 76 and threaded hole 75. The diameters of recess 76 and of enlarged recess 77 correspond respectively to the outer diameters of the tubular body of ferrule 60 and its flange 61.

An actuating screw 80, which may preferably have a socket head 81 at its outer end, is adapted to be inserted into the threaded hole 75 of the clamp 70. The lower half 72 of clamp 70 is provided with an extended arm 78 which may be grasped by the operator and used to prevent rotation of clamp 70 when the screw 80 is tightened in the hole 75, as by tool T shown in phantom in FIGS. 3 and 4.

FIG. 2 shows, in section, the cover housing 30 containing barrel lock 40 and the tubular ferrule 60 with its ring or annular rib 62 inside the cover housing and its flange 61 outside.

FIG. 3 shows, in section, the two-piece clamp 70 after it has been placed over the ferrule 60 and clamped together by the wing bolts 73. In FIG. 3, the actuating screw 80 is shown partially inserted into the threaded hole 75 with the inner end of the screw spaced from the outward end of the ferrule 60.

FIG. 4 shows the position of the clamp 70 after the actuating screw 80 has been rotated inwardly by tool T so that the forward end of the screw 80 abutted against the outer surface of head 41 of inwardly-immovable barrel lock 40. As rotation of the screw 80 in the tightening direction continued, the clamp 70 moved outwardly on the screw 80, thereby pulling the ferrule outwardly. When the annular rib 62 of ferrule 60 reached the cover wall 31, continued outward pull on the ferrule allowed the ferrule to be removed from the cover housing 30 as illustrated in FIG. 4, either because hole 35 in the cover wall 31 became enlarged, or because the annular rib 61 of the ferrule became flattened, or because the tubular ferrule 60 became otherwise deformed, or because of a combination thereof.

What is claimed is:

1. A ferrule extractor tool for extracting a tubular ferrule from the cover housing of a kilowatt-hour meter which has a split locking ring having outwardly extending end extensions at the location of the split which are screwed together and covered by said cover housing, said cover housing being provided with a barrel lock for preventing removal of said cover housing, said barrel lock having a cylindrical head portion which is covered by said ferrule, said ferrule having an annular rib at its inward end located within said cover housing, said ferrule having an annular flange at its outer end located outside said cover housing, said ferrule extractor tool comprising:

a. a two-piece clamp comprised of two halves adapted to be mated together;
b. each half being provided with a semi-circular threaded portion at one end, a first semi-circular recess portion at the other end, and a second semi-circular flange-receiving recess between said first recess and said threaded portion;
c. said clamp halves being adapted to be bolted together to form a clamp, said clamp having a threaded hole of circular cross section at said one end, a circular first recess having a diameter corresponding to the outside diameter of said tubular ferrule at said other end, and an enlarged circular second recess between said first recess and threaded portion, said second recess having a diameter corresponding to said flange of said ferrule; and
d. an elongated actuating screw of circular cross section adapted to be threaded into said threaded hole of said clamp, said screw being adapted to be rotated inwardly through said threaded hole of said clamp and into the hollow center bore of said tubular ferrule, the inner end of said screw coming into abutting position against the head of said barrel lock, continued rotation of said screw in the tightening direction causing said clamp to move outwardly on the threads of said screw thereby pulling said ferrule outwardly, thereby to remove said ferrule from said cover housing of said meter.

2. A ferrule extractor tool according to claim 1 wherein said actuating screw is provided with a socket head adapted to receive an actuating socket tool.

3. A ferrule extractor tool according to claim 1 wherein one of said clamp halves is provided with an elongated handle adapted to be grasped by the operator to prevent rotation of said clamp during tightening of said actuating screw.

* * * * *